US00RE35432E

United States Patent [19]

LaBounty et al.

[11] E Patent Number: Re. 35,432

[45] Reissued Date of Patent: Jan. 28, 1997

[54] DEMOLITION TOOL FOR A HYDRAULIC EXCAVATOR

[75] Inventors: Roy E. LaBounty; Kenneth R. LaBounty, both of Two Harbors, Minn.

[73] Assignee: LaBounty Manufacturing Co., Two Harbors, Minn.

[21] Appl. No.: 401,366

[22] Filed: Mar. 9, 1995

Related U.S. Patent Documents

Reissue of:

[64] Patent No.: 5,060,378
Issued: Oct. 29, 1991
Appl. No.: 451,377
Filed: Dec. 15, 1989

[51] Int. Cl.[6] ..... B23D 17/06

[52] U.S. Cl. ..... 30/134; 30/92

[58] Field of Search ..... 30/134, 92, 180, 30/228; 72/453.16, 453.2; 83/694; 91/229; 137/633; 251/116; 241/101.72

[56] References Cited

U.S. PATENT DOCUMENTS

| | | | |
|---|---|---|---|
| 2,760,265 | 8/1956 | Draenert . | |
| 3,294,131 | 12/1966 | Larson | 30/134 |
| 3,824,152 | 6/1974 | Pallari . | |
| 3,972,097 | 8/1976 | Schakat . | |
| 4,005,894 | 2/1977 | Tucek . | |
| 4,017114 | 4/1977 | LaBounty . | |
| 4,104,792 | 8/1978 | LaBounty . | |
| 4,168,729 | 9/1979 | Tausig et al. . | |
| 4,188,721 | 2/1980 | Ramun et al. | 30/134 |
| 4,196,862 | 4/1980 | Tagawa . | |
| 4,198,747 | 4/1980 | LaBounty | 30/134 |
| 4,217,000 | 8/1980 | Watanabe | 299/67 |
| 4,274,457 | 6/1981 | Nilsen | 144/34 |
| 4,382,625 | 5/1983 | LaBounty | 294/104 |
| 4,387,752 | 6/1983 | Tyer . | |
| 4,392,263 | 7/1983 | Amoroso . | |
| 4,439,921 | 4/1984 | Ramun | 30/134 |
| 4,512,524 | 4/1985 | Shigemizu | 241/101 |
| 4,519,135 | 5/1985 | LaBounty | 241/134 |
| 4,536,976 | 8/1985 | Holopainen | 37/117 |
| 4,543,719 | 10/1985 | Pardoe . | |
| 4,558,515 | 12/1985 | LaBounty | 30/134 |
| 4,587,732 | 5/1986 | Lind et al. . | |
| 4,670,983 | 6/1987 | Ramun | 30/134 |
| 4,686,767 | 8/1987 | Ramun et al. | 30/134 |
| 4,776,524 | 10/1988 | Sakato | 241/101 |
| 4,838,493 | 6/1989 | LaBounty | 241/101 |

FOREIGN PATENT DOCUMENTS

| | | |
|---|---|---|
| 28668 | 7/1975 | Chile . |
| 31141 | 9/1979 | Chile . |
| 36991 | 5/1989 | Chile . |
| 36487 | 7/1989 | Chile . |
| 0218899 | 4/1987 | European Pat. Off. . |
| 8526390 | 12/1985 | Germany . |
| 3618191 | 12/1987 | Germany . |
| 0205349 | 11/1985 | New Zealand . |
| 0203534 | 4/1986 | New Zealand . |
| 2122125 | 1/1984 | United Kingdom . |

OTHER PUBLICATIONS

Geith Brochure, four pages, LaBounty Catalog, pp. 3, 5, 6, 9–14.

*Primary Examiner*—Douglas D. Watts
*Attorney, Agent, or Firm*—Pepe & Hazard

[57] ABSTRACT

A demolition tool for attachment to the boom structure and hydraulic system of a hydraulic excavator having a pair of jaws pivotally connected together as to be mountable on the frame of the tool by a movable pin so that the jaws may be placed with other jaws having other forms of demolition characteristics. The jaws may be a shear for steel or other structural material, including concrete, and the jaws may be a concrete crusher, a rock or coral breaker, a wood shear, a plate shear, or other form of demolition device. Both jaws are swingable and independently swingable, operated by a common manifold supplying hydraulic fluid to the cylinders. The jaws swing through operational arcs and are arranged so that the direction of thrust from the cylinders is tangential to the pin connecting the cylinders to the jaws at a location intermediate the ends of the operational arcs.

19 Claims, 5 Drawing Sheets

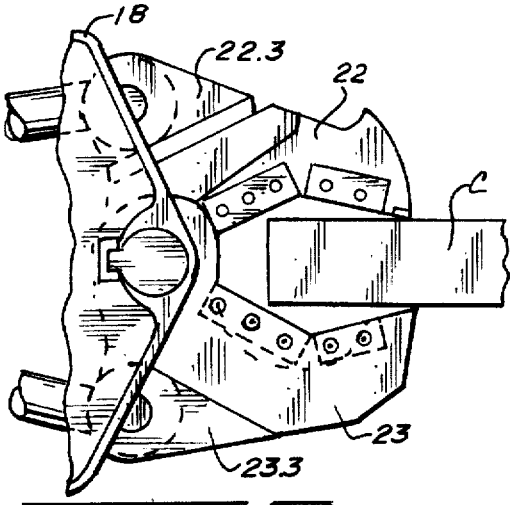
Fig. 2.
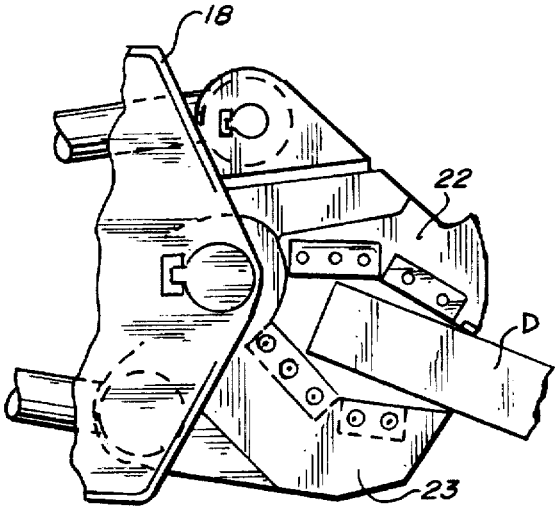
Fig. 3.
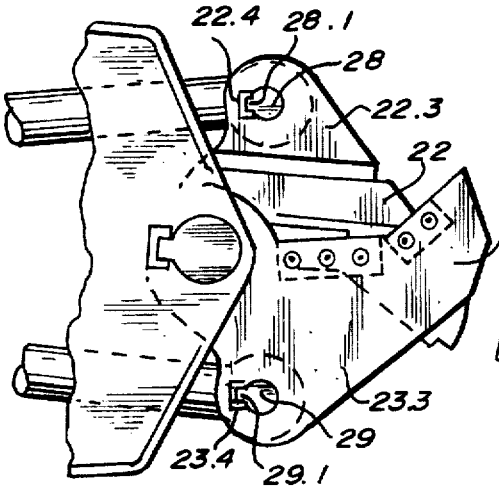
Fig. 4.
Fig. 5.
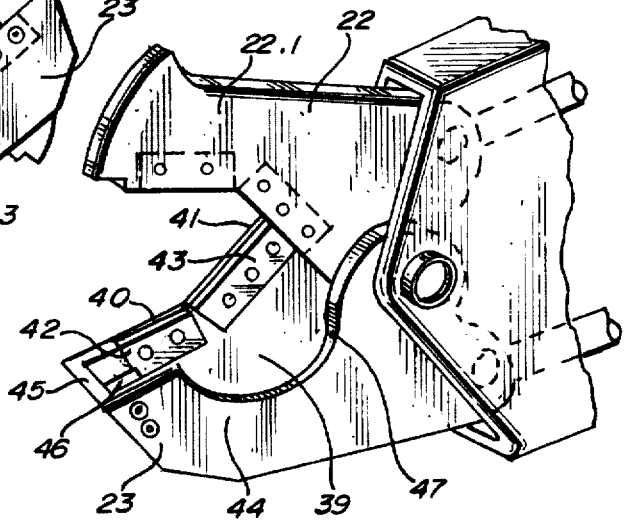

DEMOLITION TOOL FOR A HYDRAULIC EXCAVATOR

Matter enclosed in heavy brackets [ ] appears in the original patent but forms no part of this reissue specification; matter printed in italics indicates the additions made by reissue.

This invention relates to a heavy-duty mobile demolition tool as an attachment for a hydraulic excavator.

BACKGROUND OF THE INVENTION

Heavy-duty shears have been developed for use in demolition work as in the demolition of structures such as buildings. Although shears were first intended to shear steel I-beams, pipes, columns and the like, they have been found to be very useful in removing bridge decks in highway rebuilding activity and in many other types of demolition work. Such shears have been illustrated in a number of U.S. patents, such as Labounty U.S. Pat. No. 4,519,135 and Ramun U.S. Pat. No. 4,403,431.

However, other demolition attachments such as concrete crushers or pulverizers, and heavy-duty wood or log shears have also been devised for mounting on hydraulic excavators. See U.S. Pat. Nos. 4,838,493; 4,106,862; 4,515,524; 4,776,524; 4,872,264, and copending application Ser. No. 254,145, filed Oct. 6, 1988.

SUMMARY OF THE INVENTION

An object of the invention is to provide, as an attachment for a mobile power source such as a hydraulic excavator, a heavy-duty mobile demolition tool which is capable of engaging and severing workpieces to which nearly maximum force may have to be applied at any of the wide range of stages in the severing process. For instance, certain types of workpieces, such as rock or concrete, may require that maximum demolition force be applied when the jaws of the tool are nearly wide open; and for demolishing other types of workpieces, such as in shearing steel, maximum demolition force may have to be applied when the jaws are nearly closed.

A feature of the invention is providing the attachment with a jaw driving cylinder in an arrangement wherein during extension of the cylinder ram, the radius between the point of connection to the jaw and the jaw pivot is oriented approximately normal to the direction of extension of the cylinder when the cylinder ram is extended about halfway between full extension and full retraction. The point of connection between the ram of the cylinder and the jaw will swing through an operational arc during a closing of the jaws; and the direction of extension of the cylinder lies tangent to the operational arc at a position approximately midway between the ends of the operational arc or approximately midway between the positions wherein the cylinder is fully retracted and fully extended. This same driving arrangement is applied to both movable jaws so that the jaws may be opened very widely and also fully closed toward each other while swinging through a minimal operational arc.

Another object of the invention is to provide in such a demolition tool for a hydraulic excavator, the capability of engaging the workpiece in such an attitude so that the bite of the tool will be of nearly maximum size and so that the necessary demolition force will be applied regardless of whether the boom of the excavator is in exactly the optimum position. Accordingly, the high magnitudes of strain and forces on the equipment will be borne by the demolition tool rather than the boom structures of the excavator.

A feature of the invention is mounting both demolition jaws to swing independently of each other and driving the jaws to allow staging of jaw movement as may be desirable, depending upon the nature and shape of the workpiece being worked on. Preferably, the hydraulic cylinders of both jaws are supplied with high pressure hydraulic fluid from the same pressurized source and from a common manifold. The fluid will flow to the cylinder wherein least resistance is encountered, and if one demolition jaw first engages a workpiece, such as a thick concrete slab, that jaw may remain stationary while the other demolition jaw continues to swing. Thereafter, when both demolition jaws are in engagement with the workpiece, both jaws will apply demolishing force onto the workpiece to produce severing as by crushing or otherwise.

Still another object of the invention is to provide an attachment for the mobile power source which is readily convertible to any of a multiplicity of heavy-duty demolition tools such as a heavy-duty shear, a rock or coral breaker, a concrete crusher, a stump or log shear, or a plate shear. By simply changing the jaws of the tool, the attachment may serve numerous purposes.

Accordingly, a feature of the invention is an attachment having connection to the demolition jaws by a readily removable pivot pin which provides the only connection between the frame of the attachment and the jaws. The jaws may also be pivotally interconnected to remain together when removed from the attachment frame. Two separate pins connect the rams of the hydraulic cylinders to the jaws and are readily removable.

It will be seen in the drawings that the demolition jaws may take any of various forms. The demolition may take any of a number of different forms as indicated previously. Demolition usually, but not always, involves severing the workpiece in one way or another. The severing may be effected by shearing, cutting, cracking, breaking, crushing, sundering, rending, wrenching apart, etc., depending upon the nature and size and shape of the workpiece and the demolition jaws of the tool.

BRIEF DESCRIPTION OF THE DRAWINGS

FIG. 2 illustrates the demolition jaws in partly closed condition and grouping a workpiece.

FIG. 3 is another view illustrating the functioning of the jaws in a different attitude as compared to that illustrated in FIG. 2.

FIG. 4 illustrates the jaws in fully closed condition.

FIG. 5 is a perspective view showing the principal components of the shear or demolition tool illustrated in FIGS. 1–4.

DETAILED SPECIFICATION

Figures 1, 1A:
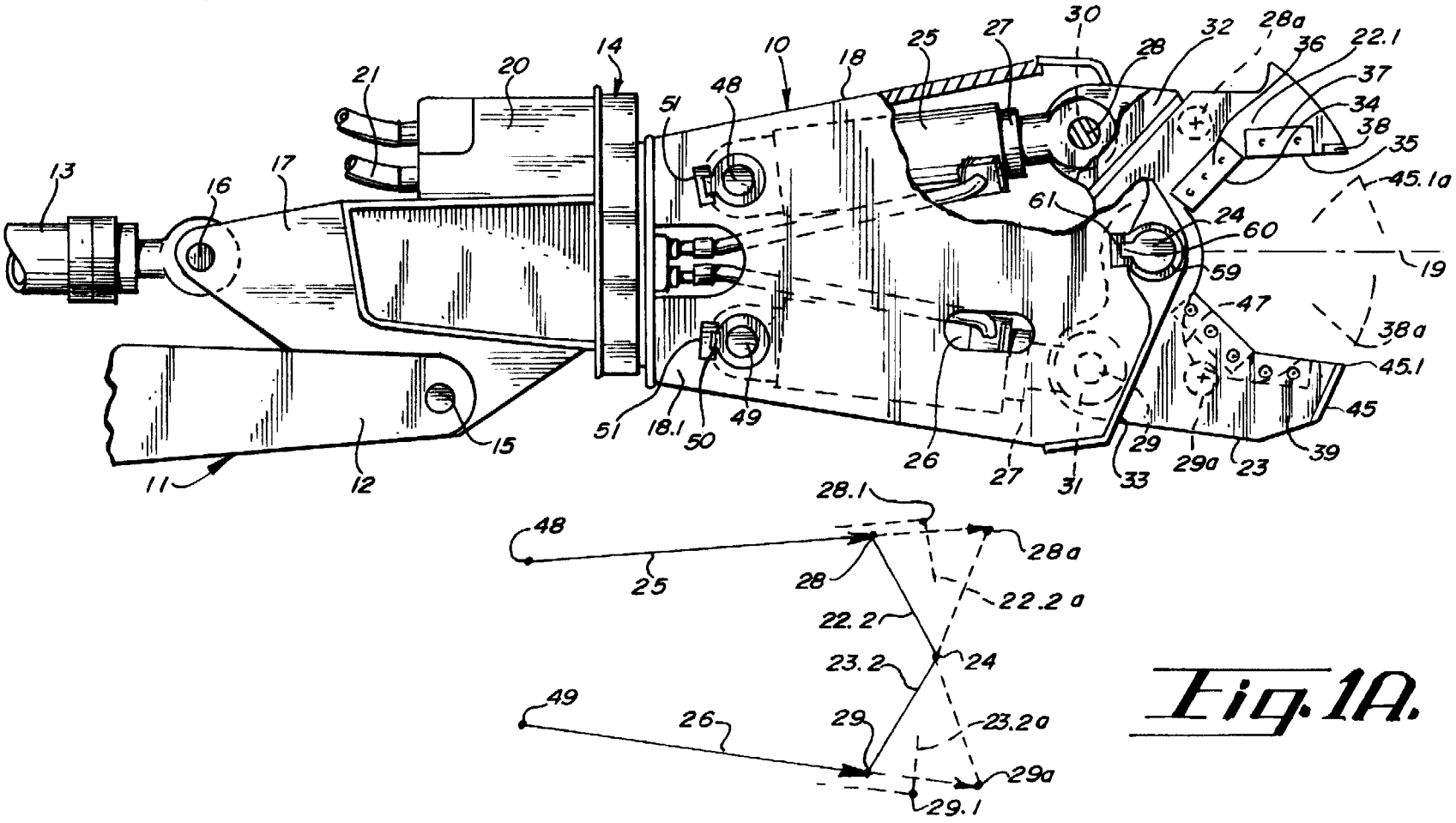
FIG. 1 is an elevation view of the attachment shown connected to the boom structure and hydraulic system of a hydraulic excavator.
FIG. 1a is a diagrammatic view illustrating the extension and retraction of the cylinders and the swinging movement of the jaws.

One form of the invention is illustrated in the drawings and is described herein.

The demolition tool is indicated in general by numeral 10 and comprises an attachment for a mobile power implement indicated in general by numeral 11, of which the boom 12 is seen adjacent to the main hydraulic cylinder 13 of the hydraulic excavator for manipulating the demolition tool 10. The demolition tool 10 has a frame means which is indicated in general by the numeral 14 and which is tiltably mounted by a mounting pin 15 on the boom structure 12 of the excavator. The frame means 14 may be tilted to various angles by the hydraulic cylinder 13 which is connected to the frame means by a connector pin 16 as to control the attitude of the tool 10 in certain respects.

The frame means includes the mounting portion 17 which is connected to the boom structure 12 and hydraulic cylinder 13; and also includes a rotatable frame 18 which is connected to the frame 17 and is rotatable with respect to the frame 17 about a centerline or axis of rotation indicated by the dashed line 19.

A hydraulic motor 20 is mounted on the frame portion 17 to operate certain gearing for revolving the frame with respect to the frame 17 and with respect to the boom structure 12.

A cluster of hydraulic hoses or connections 21 is attached to the hydraulic system of the hydraulic excavator 11, which system also includes the cylinder 13 for operating the motor 20 to rotate the frame portion 18 as desired. Of course, the controls for the hydraulic system are in the cab of the excavator, to be controlled by the operator The tool 10 also includes a pair of demolition jaws 22 and 23 which are mounted on the frame 18 by a single removable pivot pin 24 about which the jaws 22 and 23 swing. The jaws are operated by extensible and retractable means in the form of hydraulic cylinders 28 and 26, the rams 27 of which are swingably connected by pins 28 and 29 and thrust bearings 30 and 31 to the connector portions 32 and 33 of the jaws 22 and 23. The jaws 22 and 23 constitute heavy-duty shears as illustrated in FIGS. 1–5, and accordingly the upper jaw 22 has shear edges 34 and 35 which extend obliquely to each other at an obtuse angle and are defined by hardened steel insert blocks 36 and 37 respectively. A hardened tip end block 38 is also provided on the tip end of the upper jaw 22.

Similarly, the swingable lower jaw 23 also has a shear blade 39 with shearing edges 40 and 41 oriented at oblique angles with respect to each other and defined by hardened steel insert bars or knives 42, 43 which are bolted to the shear blade 39 and are replaceable. The lower jaw 23 also includes a guide blade 44 secured by a tie plate 45 to the lower shear blade 39 so as to be rigidly connected to the lower shear blade. The guide blade 44 also has a replaceable spacer or wear plate 46 bolted thereto adjacent the outer end as to bear against the side of the upper shear blade 22.1 and hold all of the shearing edges 35, 36, 40, 41 in shearing relation to each other. The top edge surface 47 of the guide blade 44 is recessed below the level of the edges 443, 41 of the lower shear blade 39. As the cylinders 25, 26 are extended, the jaws 22, 23 swing through operational arcs from the fully open position illustrated in FIG. 1 to the fully closed position illustrated in FIG. 4. As the jaws swing through the operational arc, the tip ends 38, 45.1 swing from the full line positions illustrated in FIG. 1 to the dotted line positions illustrated in FIG. 1 and indicated by the numerals 38a and 45.1a. During swinging of the jaws through the operational arcs, the connector pins 28, 29 and their respective thrust beatings 30, 31 by which the extendible rams 27 apply demolition force onto the jaws, will swing to the dotted line position 28a, 29a.

Cylinders 25, 26 are mounted on the frame plates 18.1 by removable pivot pins 48, 49, the heads of which have radially extending keys retained in keyways 51 as to prevent the pins 48, 49 from rotating, but permitting removal of the pins by axially withdrawing them from the frame and the ends of the cylinders, 25, 26.

As the cylinders 25, 26 extend and retract as to produce swinging of the jaws 22, 23 through their operational arcs, the cylinders 25, 26 also swingably oscillate very slightly about the pivot pins 48, 49, thus permitting the connector pins 28, 29 to swing through the operational arc about the center of pivot 24 as the jaws 22 are swung between open and closed positions.

The relation between the jaws and the hydraulic cylinders, and the pivot which mounts the jaws on the frame, is arranged as to cause substantially maximum force or thrust to be supplied by the cylinders 25, 26 to the jaws and to the workpiece-demolishing faces of the jaws throughout substantially the entire operational arcs of the jaws.

In FIG. 1a, the relation is illustrated diagrammatically to show that the force supplied by the cylinders is maintained at nearly maximum level throughout the entire operational arc. The points 28, 28a show the ends of the operational arc of the jaw 22 and the cylinder 25 is retracted and extended. Similarly, the points 29, 29a show the retracted and extended positions of the lower jaw 23 as the cylinder 26 is retracted and extended to opposite ends of the operational arc.

Maximum thrust from the cylinders 25 and 26 is applied to the jaws 22, 23 when the direction of extension of the cylinders 25, 26 from the pivots 48, 49 and to the pivots 28, 29, have been extended until the connector points 28, 29 are approximately midway betwen the ends of the operational arc, and until the direction of extension of the cylinders is tangent to the operational arc subscribed by the pivots 28, 29; and when the direction of extension, i.e., a straight line between the pivots 48 and 28 and another straight line between the pivots 49 and 29 are oriented at fight angles or normal to the radii 22.2, 23.2 between the the pivot 24 and the pivots pins 28, 29, respectively. The position of these radii 22.2, 23.2 in shifted position at the moment of maxium thrust is shown in FIG. 1a by the dotted lines indicated by the numerals 22.2a and 23.2a. At the moment of maximum thrust from the cylinders 25, 26 the imaginary lines between pivots 48, 28.1 and 24 are at right angles to each other; and the pivots 49, 29.1 and 24 are at rights angles to each other. The points in FIG. 1a indicated by numerals 28.1, 29.1 are on the operational arc followed by the pins 28, 29.

While the size of the angle between the opposite ends of the operational arc is not intended to be limiting according to this invention, it has been found that the total operational arc of each jaw may be in the range of 50°; and from the location wherein maximum thrust is exerted, the arc may be in the range of 25° to 30°.

The cylinders 25 and 26 are preferably connected by common manifolds 52, 53 to a reversing valve 54 which is preferably located in the cab of the hydraulic excavator to be controlled by the operator. The valve 54 is connected at one side 55 to a source of pressure in the hydraulic system, such as a high pressure pump, and is also connected at 56 to a hydraulic fluid return, such as a resevoir, which is also a pan of the hydraulic system. Because the hydraulic cylinders 25 and 26 are connected by the common manifolds to the source of pressure and to the return duct, the jaws 22, 23 are free to turn at various angles with respect to the frame 18 and with respect to each other as the jaws are closing. When the jaws are in a fully open position as illustrated in FIG. 1, the valve 54 may be reversed as the tool 10 approaches a workpiece, such as the concrete slab C illustrated in FIG. 2, and if the slab is oriented substantially as illustrated, both jaws will be strung partially through their operational arcs and may engage the workpiece C approximately simultaneously. On the other hand, if the workpiece D as illustrated in FIG. 3, which may be a concrete slab, is oriented as illustrated, the lower jaw 23 may initially engage the workpiece before the jaw 23 has had a chance to swing at all, or the lower jaw 13 may swing through a small angle before it engages the workpiece D. At this moment, the top jaw may still be in the position illustrated in FIG. 1. Because the cylinders are connected to a common manifold, the hydraulic fluid will flow to the area of least resistance, and in this instance the concrete slab or workpiece D may bear against the jaw 13 as to restrain it from moving; and simultaneously, hydraulic fluid will flow into the cylinder 25 as to swing the jaw 22 until the jaw engages the workpiece. When both jaws have engaged the workpiece, the back pressure in the two cylinders 25 and 26 is the same, and as additional hydraulic fluid flows into the cylinders, pressure is applied onto the workpiece to cause severing of it or crushing. The shear blades will shear any reinforcing rods in the concrete slab and this way the workpiece D will be demolished.

The idependently and freely swingable upper and lower jaws 22 of the tool which may be in fully open position as the tool approaches the workpiece, permit the jaws to orient themselves to the orientation of the workpiece, and accordingly, the jaws will take a full sized bite on the workpiece as to accomplish a substantial amount of work with each cycle of operation of the demolition tool.

Because the jaws are freely independently swingable with respect to each other and with respect to the frame 18 of the tool, the reactive forces from the jaws onto the frame of the tool 10 and onto the boom structure 12 of the machine will be minimized, and at the same time, the demolition jaws may take a maximum bite onto the workpiece for severing or crushing portions of it.

Figure 6:
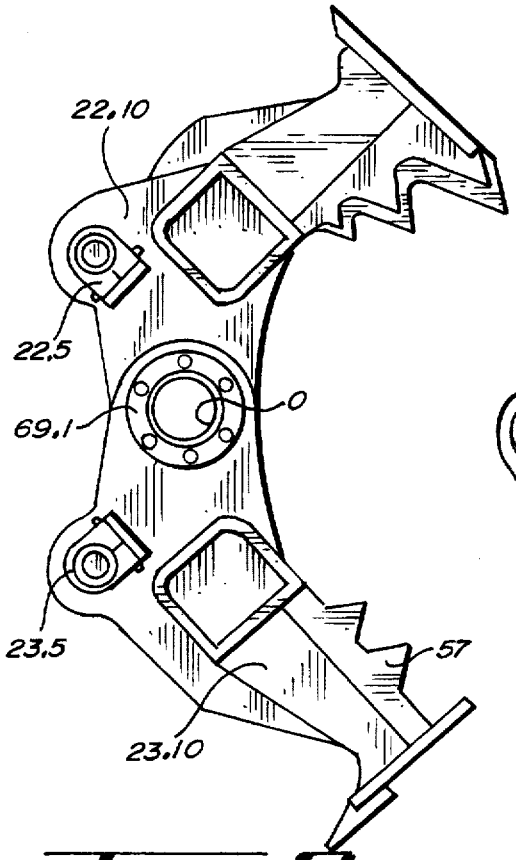
FIG. 6 is an elevation view of an alternate form of demolition jaws alternately mountable upon the attachment frame.
Figure 15:
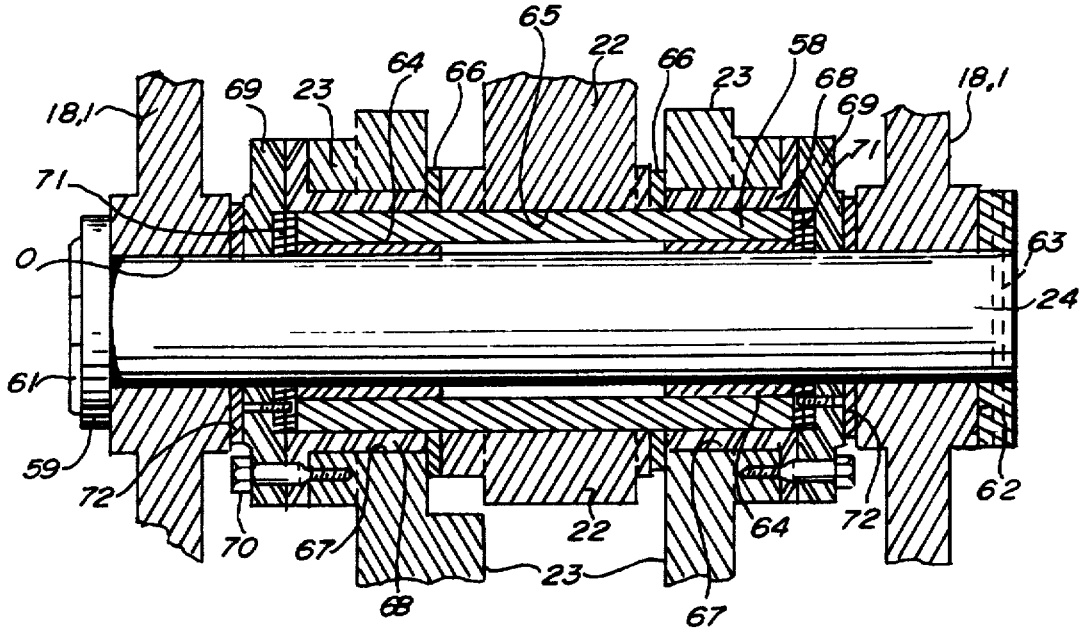
FIG. 15 is detailed section view through the pivot structure of the attachment.

The demolition jaws 22, 23 of the demolition tool 10 are readily demountable as to be replaceable. The pivot pin 24 may be readily removed from the jaws and frame, simply by sliding it out of the jaws and adjacent frame plates 18.1. The pivot pins 2.8, 29 are readily removable as to separate the jaws from the thrust bearings 30, 31 of the rams 27, thereby entirely freeing the jaws 22, 23 to be replaced. Other forms of demolition jaws may be substituted for the shears illustrated in FIGS. 1–5. In FIG. 6, the demolition jaws 22.10, 23.10 take the form of concrete crusher or pulveriser jaws similar to those illustrated in U.S. Pat. No. 4,838,493. The concrete crusher jaws include an array of points and protrusions 57 which may take a wide variety of shapes and arrangements, to apply localized pressure at a multiplicity of locations on the concrete workpiece and cause crushing of it into small chunks as to loosen the reinforcing rods which may be salvaged for purposes other than the concrete. The jaws 22.10 and 23.10 are secured together by a hollow connector pin identical to the connector pin 58 by which the jaws 22, 23 of the tool 10 are connected. FIG. 15 illustrates the pivot construction of the jaws 22, 23 and the readily demountable feature which utilizes the removable center pivot pin 24. The removable pivot pin 24 extends entirely through the pivot structure for the jaws 22, 23 and through the mounting hubs of the outside frame plates 18.1. The head 59 on pin 24 has a radially projecting key 60 projecting into and retained by a correspondingly shaped keyway 61 on the outside of the adjacent frame plate which retains the pin 24 against rotation relative to the frame plate. A removable collar 62 retains the other end of the removable pin 24 stationary relative to the frame plates to prevent unintentional removal of the pin. The collar 62 is demountably affixed to the pivot pin 24 as by a retainer or key pin 63.

The hollow connector pin 58 is cylindrical and has a pair of internal bronze bushings 64 to receive and bear against the removable pivot pin 24 and allow the hollow connector 58 to revolve on the stationary pin 24.

The upper swingable jaw 22 is press fit onto the outer periphery of the connector pin 58. Accordingly, the upper jaw 22 has a central opening 65 which tightly fits in a press fit onto the outer periphery of the pin 58 so that the upper jaw 22 will not rotate with respect to the pin 58, but is stationary, with the pin 58 which will turn as the upper jaw 22 turns.

Adjacent the hub portions of the upper jaw 22 are a pair of thrust washers 66 which maintain spacing between the hub portions of the upper jaw 22 and of the lower jaw 23.

The lower jaw 23 has a central opening 67 which receives bronze bushings 68 therein. The bronze bushings 68 are mounted on the outer periphery of the hollow pivot pin 58 and facilitate the lower jaw 23 to rotate with respect to the pin 58. The bronze bushings 68 and the pivot pin 58 are clamped and retained together by a pair of retainer caps 69 which are fastened to the hub portions of the lower jaw 23 by cap screws 70.

Thrust washers 71 are provided between the retainer caps 69 and the ends of the pivot pin 58. Additional thrust washers or spacers 72 are provided between the end caps or retainers 69 and the adjacent hub portions of the frame plates 18.1.

The jaw assembly, including upper and lower demolition jaws 22, 23, hollow pivot pin 58, end caps 69 and the detail bushings and washers described, have a central opening 0 including the aligned openings of all the assembled parts. The opening 0 removably receives the pivot pin 24 which is supported by the frame plates 18.1

As seen in FIG. 4, the portions 22.3, 23.3 of the upper and lower jaws receive the connector pins 28, 29 by which the rams 27 of cylinders 25, 26 are connected to the jaws. The pins 28, 29 have transversely projecting keys 28.1, 29.1 received into key ways of retainers 22.4, 23.4 as to prevent pins 28, 29 from routing, but allowing the pins to be readily removed. The pins are retained against accidental removal by conventional collars or pins.

In FIGS. 6–12 other types of retainers 22.5, 23.5 are illustrated for preventing pins 28, 29 from removal and from routing.

By this pivot construction, the pivot pin 24 is stationary with the frame 18; the upper jaw 22 and pivot pin 58 turn on the central pin 24 as the cylinder 25 is extended and retracted; the lower jaw 23 and the bushings 67 and the end caps 69 turn on the pivot pin 58 as the cylinder 26 is extended and retracted. In order to change jaws on the tool 10, the pivot pins 28, 29 which connect the rams to the jaws must be removed; and then the main pivot pin 24 will be removed by simply removing the collar 62 and sliding the pin 24 out of the jaws and adjacent frame plates 18.1.

Each of the other demolition tools illustrated in FIGS. 6–13 have a similar mounting and pivot structure pin receiving opening 0, and and each of the demolition jaws illustrated utilizes a hollow connector pin 58 to hold the jaws together so that the jaws will remain in assembly with each other when the jaws are to be replaced on the tool 10.

Figure 7:
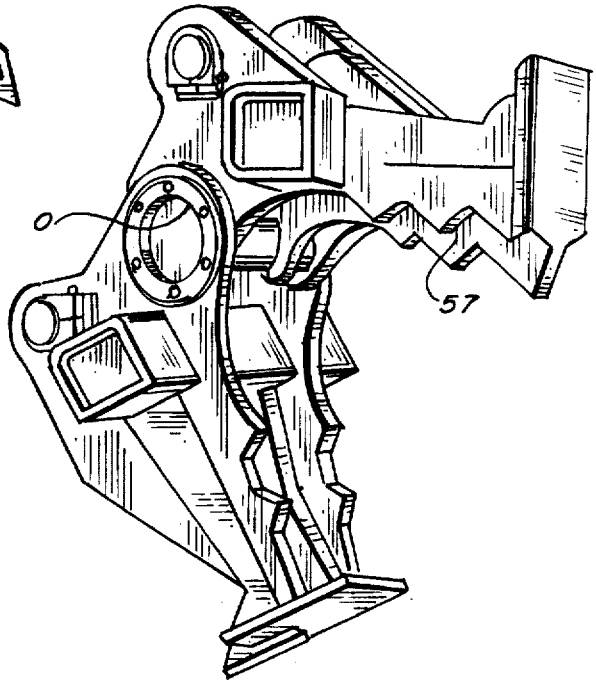
FIG. 7 is a perspective view of the tool illustrated in FIG. 6.

As seen in FIGS. 6 and 7, the concrete crusher jaws have end caps 69.1 which are identical to the end caps 69 of FIG. 25 for retaining the jaws and hollow pivot pin in assembly.

Figure 8:
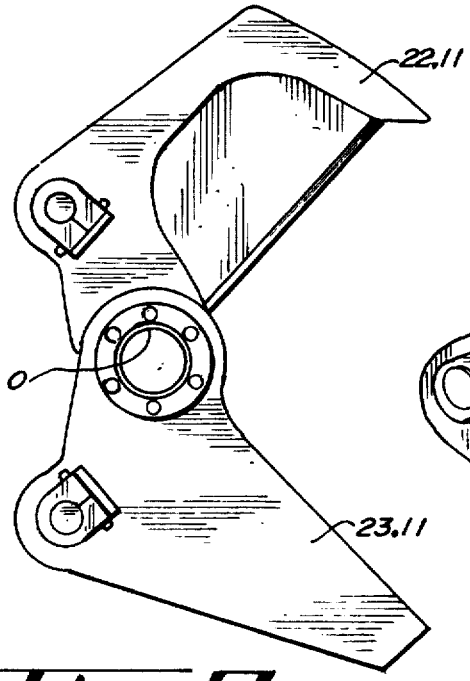
FIG. 8 is an elevation view of a wood shear which may be readily substituted for the jaws illustrated in FIG. 1.
Figure 9:
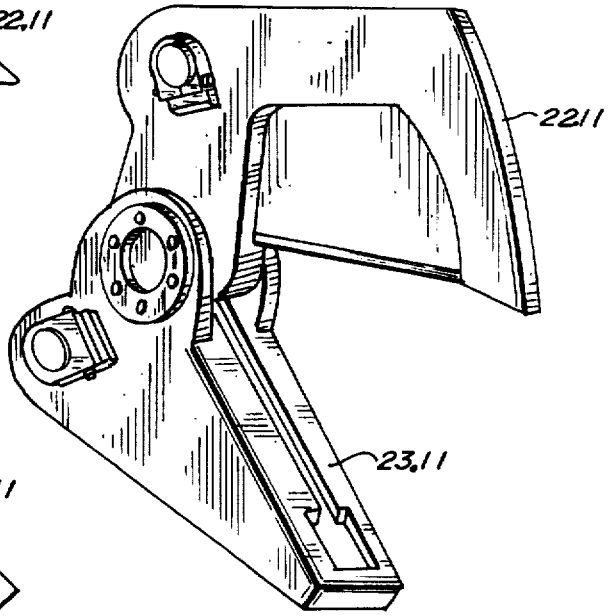
FIG. 9 is a perspective view of the wood shear illustrated in FIG. 8.

In FIGS. 8 and 9, another form of demolition jaws are illustrated and in this case, the jaws 22.11 and 23.11 form a wood cutting shear for handling big chunks of wood and stumps. These wood shear jaws are substantially identical to those illustrated in co-pending application Ser. No. 254,145, filed Oct. 6, 1988. Again, the jaws 22.11 and 23.11 are connected together so that they may be inserted into the tool 10 to replace the jaws 22, 23, simply by inserting the mounting pin 24 and connecting the pins 28, 29 for connecting the hydraulic cylinder.

Figure 10:
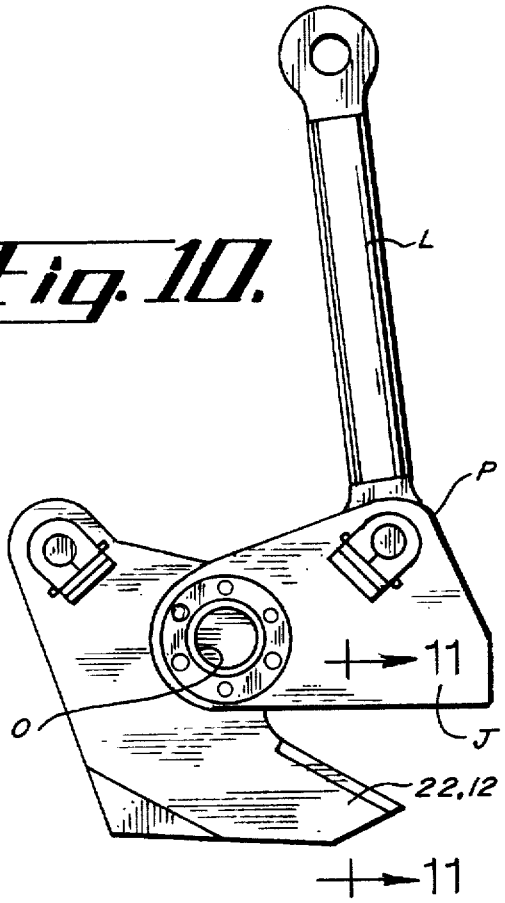
FIG. 10 is an elevation view of a plate shear which may be substituted in the attachment.
Figure 11:
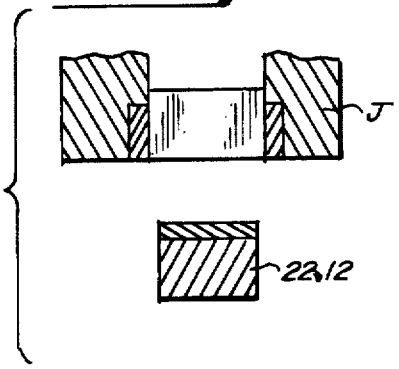
FIG. 11 is a detailed section view taken approximately at 11—11 of FIG. 10.

In FIGS. 10 and 11, a plate shear P is illustrated for attachment to the tool and has a movable jaw 22.12 and a second jaw J which is intended to be stationary and which is connected by a rigid link L to replace one of the cylinders of the tool. The jaw 22.12 is connected in the usual way to the other cylinder and the pivot structure has an opening 0 to receive the pivot pin.

Figure 12:
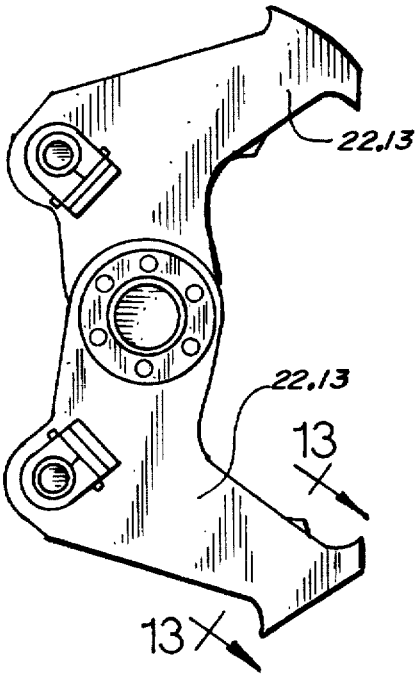
FIG. 12 is an elevation view of an alternate set of demolition jaws incorporating a rock or coral breaker and which may be substituted in the attachment for the jaws illustrated in FIG. 1.
Figure 13:
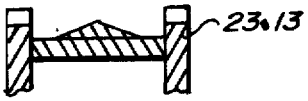
FIG. 13 is a detailed section view taken approximately at 13—13 of FIG. 12.
Figure 14:
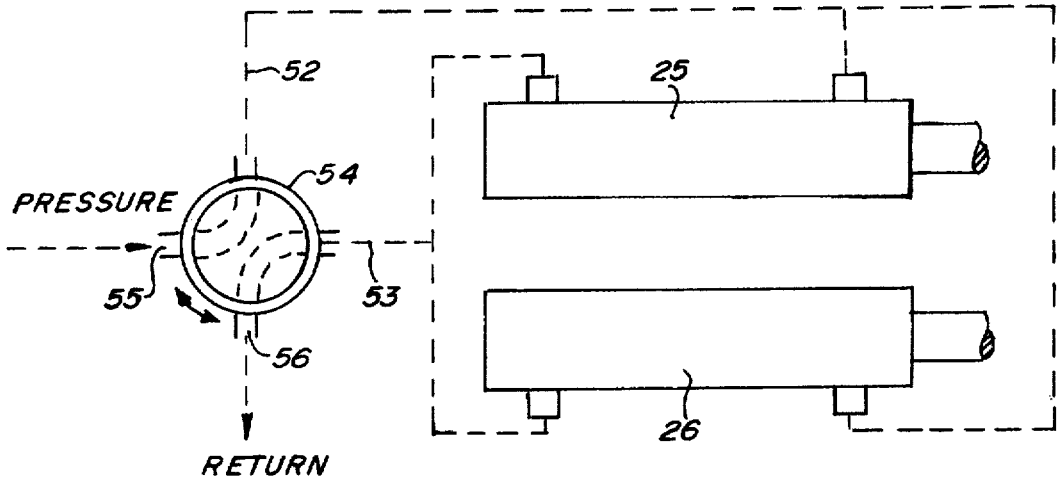
FIG. 14 is a diagrammatic view showing the typical hydraulic circuit for the cylinders of the operating tool illustrated in FIG. 1.

In FIGS. 12 and 13, the jaws 22.13 and 23.13 take the form of a rock or coral breaker. These demolition jaws have an array of tips or points which are staggered in relation to each other so that the points will not directly confront each other as the jaws are closed and accordingly, demolition force can be exerted against a large rock or coral chunk as to cause breaking of it into smaller pieces.

It will be seen that the present invention provides a single tool as an attachment for a hydraulic excavator which facilitates the mounting of a number of different types of replaceable jaws on the attachment for performing various tasks as they may arise without having to duplicate equipment. The attachment also applies neary maximum demolition force from the cylinders to the demolition jaws over substantially the full range of operational arcs of the jaws. Accordingly, nearly maximum pressure may be applied onto the workpiece when the jaws are wide open as well as when they are nearly closed. Furthermore, because of the independently movable jaws and the common manifolds of the hydraulic cylinders which operate the jaws, the jaws will be free to swing at various angles with respect to each other and with respect to the frame of the attachment so that the jaws may be individually oriented at various angles. Accordingly, maximum bite may be taken against the workpiece being demolished and reactive force from the jaws to the frame of the attachment is minimized.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. A heavy-duty demolition tool for attachment to the boom and hydraulic system of a hydraulic excavator, comprising:

a frame mountable on the boom structure, a pair of demolition jaws having pivot means connecting the jaws to each other and to the frame means, the jaws being swingable through predetermined operational arcs between open and closed positions, *said pivot means including coupling means coupling said jaws and enabling pivotal motion thereof about a common axis relative to said frame and relative to each other and maintaining said jaws in assembly with each other when said jaws are dismounted as a unitary assembly from said frame,* and a pair of juxtaposed hydraulic cylinders mounted on the frame means and connectable to the hydraulic system of the excavator, each of the cylinders having a pivotal connection to a respective jaw, and the hydraulic cylinders being extensible and retractable to move the pivotal connections through such operational arc which are nearly bisected by radii which are normal to the directions of extension and retraction of the cylinders.

2. A heavy-duty demolition tool for attachment to the boom structure and hydraulic system of a hydraulic excavator, comprising:

a frame means mountable on the boom structure, a pair of demolition jaws pivotally connected to the frame means, each of the jaws being swingable through an operational arc from an open position at one end of the arc wherein the jaws are widely spaced from each other to receive a large workpiece between the jaws, and to a closed position at a second end of the arc wherein the jaws have been brought together, *said jaws being pivotably supported on said frame by pivot means including coupling means coupling said jaws and enabling pivotal motion thereof about a common axis relative to said frame and relative to each other and maintaining said jaws in assembly with each other when said jaws are dismounted as a unitary assembly from said frame,* extensible and retractable means producing substantially linear thrust and having a pair of thrust bearings each connected to a respective jaw to swing therewith through said operational arc, the direction of thrust at each bearing being substantially tangential to the arc of the bearing at a location approximately midway, between the ends of the arc, whereby to move both jaws toward closed position to demolish a workpiece.

3. A heavy-duty demolition tool for attachment to the boom structure and hydraulic system of a hydraulic excavator, comprising:

a frame means comprising rigid mounting portions mountable on the boom structure, a pair of demolition jaws having pivot means connecting the jaws to each other and to the frame means, both of the jaws being swingable relative to the frame and through predetermined operational arcs and the jaws having workpiece engaging portions swingable between open and closed positions as the jaws move through the operational arcs, *said pivot means including coupling means coupling said jaws and enabling pivotal motion thereof about a common axis relative to said frame and relative to each other and maintaining said jaws in assembly with each other when said jaws are dismounted as a unitary assembly from said frame,* and extensible and retractable means producing substantially linear thrusts and having a pair of thrust bearings each connected to a respective jaw to swing therewith through said operational arc, the force at the workpiece engaging portions of the jaws being substantially the same as the total thrust applied at the bearings throughout the operational arcs of both jaws.

4. A heavy-duty demolition tool according to claim 3 and the thrust bearing of each jaw being located on a radius from the pivot means of the jaw and in relation to the extension and retraction means so that the thrust is directed substantially normal to the radius throughout the operational arc.

5. A heavy-duty demolition tool according to claim 3 and the direction of thrust on each jaw substantially maximizing force available at the workpiece engaging portion of each jaw.

6. A heavy-duty demolition tool according to claim 3, and including a removable mounting pin defining a single axis of swinging for both jaws and demountably connecting the demolition jaws onto the frame means to facilitate replacement of the jaws.

7. A heavy-duty demolition tool according to claim 6 and a hollow connector pin mounting the jaws to each other and preventing separation thereof, the connector pin receiving said removable mounting pin therethrough and maintaining the jaws in predetermined relation to each other as the mounting pin is removed for replacing the jaws.

8. A heavy-duty mobile demolition tool for attachment to the boom structure and hydraulic system of a power implement, comprising frame means mountable on the boom structure and having a pair of rigid frame plates confronting each other in spaced relation, the plates having front end portions with aligned pin openings therethrough, a pair of heavy-duty individually swingable workpiece demolishing jaws having mounting portions disposed between the frame plates, the mounting portions having pin openings therethrough, a removable mounting pivot pin extending through the pin openings of the frame plates and jaws, the pivot pin being removable for replacing the jaws, and a hollow connector pin securing the two jaws together but permitting relative swinging thereof, the hollow connector pin receiving said removable mounting pin therethrough for demountably connecting the jaws to the frame means while maintaining the jaws in assembly with each other.

9. A heavy-duty mobile demolition tool according to claim 8 wherein said jaws swing through operational arcs between open and closed positions, extensible and retractable means connected between the frame means and said jaws by thrust bearings which swing with the jaws through such operational arcs, the extensible and retractable means extending in directions tangential to the operational arcs at positions intermediate the ends of said operational arcs.

10. A heavy-duty demolition tool for attachment to the boom structure and hydraulic system of a power implement, comprising:

a frame mountable on the boom structure, a pair of heavy-duty workpiece demolishing jaws comprising mounting portions, and jaw mounting means mounting both jaws for swinging about one *common* axis relative to the frame and relative to each other and comprising a mounting pin portion removably mounting the jaws on the frame, and also comprising a rotatable connector portion *through which said mounting pin portion extends, said jaw mounting means enabling pivotal motion of said jaws about said common axis relative to said frame and coupling said jaws for movement relative to each other about said common axis, said connector portion* retaining the jaws together independently of the frame *to enable said jaws and connector portion to be assembled on or removed from said frame as a unitary assembly upon insertion or removal of said mounting pin portion therefrom.*

11. A heavy-duty demolition tool according to claim 10 wherein the connector portion extends through the mounting portions of both jaws and permits swinging of the jaws relative to each other.

12. A heavy-duty demolition tool according to claim 10 wherein the connector portion and the pin portion extend concentrically through the mounting portions of the jaws, the frame comprising a pin opening removably receiving the pin portion.

13. A heavy-duty demolition tool according to claim 12 wherein the connector portion rotatably mounts the mounting portions of both jaws and the pin portion extends rotatably and concentrically through the connector portion.

14. A heavy-duty demolition tool for attachment to the boom structure and hydraulic system of a hydraulic excavator, comprising:

an elongate frame comprising a rear portion attachable to the boom structure and also comprising a front portion, a pair of heavy-duty workpiece demolishing jaws comprising mounting portions demountably attached to the front portion of the frame and mounting both jaws for swinging about a single axis relative to the frame and relative to each other between open and closed positions *said mounting portions being pivotably mounted on said frame by pivot means including coupling means coupling said jaws and enabling pivotal motion thereof about a common axis relative to said frame and relative to each other and maintaining said jaws in assembly with each other when said jaws are dismounted as a unitary assembly from said frame,* and a pair of extendable and retractable hydraulic cylinders extending along the elongate frame and comprising mounting pivots on the rear portion of the frame and also comprising connection portions pivotally connected to the portions of the jaws adjacent to the front portion of the frame, and cylinders extending in a forward direction and retracting to swing the jaws through an operational arc about said single axis between open and closed positions.

15. A heavy-duty demolition tool according to claim 14 wherein *said coupling means of said pivot means for* the mounting portions of the jaws comprise a *hollow* connector portion retaining the jaws together independently of the frame when demounted from the frame.

16. A-heavy-duty demolition tool according to claim 15 wherein *said pivot means for* the mounting portions of the jaws [comprise] *include* a removable pin *extending through said hollow connector* portion attaching the jaws to the frame.

17. A heavy-duty demolition tool according to claim 14 wherein said connection portions also swing through said operational arc, the direction of cylinder extension between the mounting pivots and the connector portions being normal to radii from the single axis to the connector portions when the connector portions are located within an approximate midway portion between opposite end portions of the operational arc, whereby to achieve nearly maximum thrust on the jaws.

18. A heavy-duty demolition tool according to claim 17 wherein said approximate midway portion comprises a range of 25° to 30° within the operational arc.

19. A heavy-duty demolition tool according to claim 17 wherein said direction of cylinder extension and said radii are exactly normal to each other at a location within said midway portion of the operational arc.

* * * * *